INVENTOR.
ROY E. BABBEL,
BY

ATTORNEY.

INVENTOR.
ROY E. BABBEL,
BY

ATTORNEY.

March 26, 1963 R. E. BABBEL 3,083,047
MULTI-FUNCTIONAL MOTOR VEHICLE
Filed Dec. 2, 1960 4 Sheets-Sheet 3
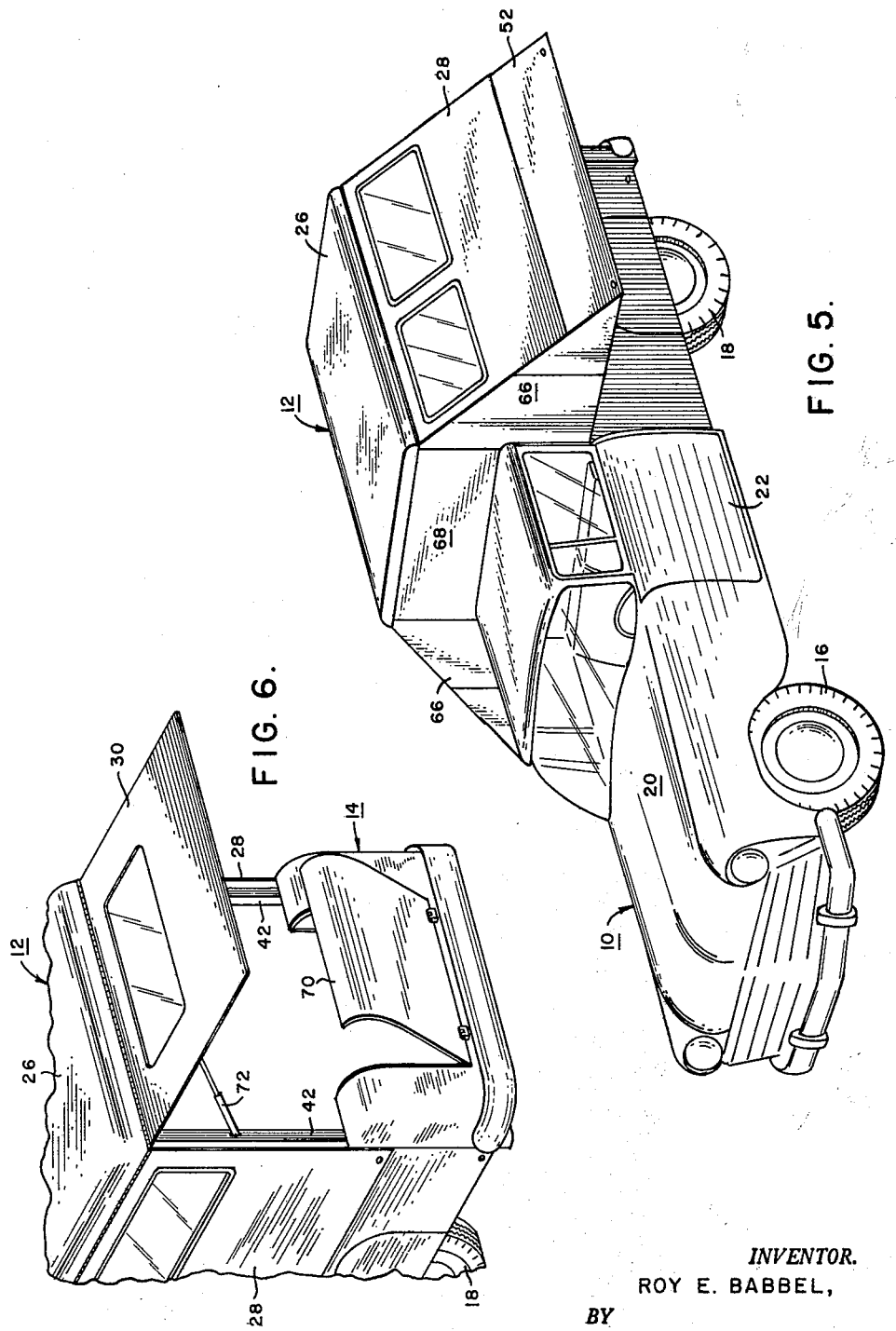
INVENTOR.
ROY E. BABBEL,
BY
ATTORNEY.

March 26, 1963  R. E. BABBEL  3,083,047
MULTI-FUNCTIONAL MOTOR VEHICLE
Filed Dec. 2, 1960  4 Sheets-Sheet 4

INVENTOR.
ROY E. BABBEL,
BY

ATTORNEY.

United States Patent Office 3,083,047
Patented Mar. 26, 1963

3,083,047
MULTI-FUNCTIONAL MOTOR VEHICLE
Roy E. Babbel, 595 Buchanan St., Twin Falls, Idaho
Filed Dec. 2, 1960, Ser. No. 73,383
3 Claims. (Cl. 296—23)

This invention relates to a multi-functional motor vehicle. More particularly, this invention relates to a multi-functional motor vehicle having a van section adjustable to provide for passenger service, storage service, housing services, etc.

The construction of the van portion of a motor vehicle is normally a limiting factor with respect to the service or services for which the vehicle may be used, and the ease with which the configuration of a van section can be altered for different types of service is important if a van is to provide for more than one type of service.

The present invention is directed to a motor vehicle having a self-contained van section comprising parts that can be adjusted with ease to provide a variety of van configurations for a variety of service uses.

Thus, the configuration of the van section of the present invention can be arranged to provide for comfortable passenger service, for service in transporting bulky objects, for housing service, etc., as a result of which the utility of a motor vehicle is greatly increased.

Briefly, a motor vehicle of the present invention may be described as a motor vehicle comprising a cab section and a van section adjacent the cab section having a roof section vertically extensibly mounted on the frame of a motor vehicle, laterally extensible side sections pivotally mounted to said roof section on each side of said vehicle and means pivotally mountable on each of said side sections and pivotally connectable with the cab section for laterally extending the corresponding side section on extension of said roof section.

In accordance with a preferred embodiment of the present invention, there is provided a motor vehicle having a forward cab section, a van section rearwardly of the cab section comprising an extensible roof member, a rear panel pivotally mounted on the roof member, a pair of side assembly panels on each side of the motor vehicle; each of said side assemblies comprising an extensible outer side panel pivotally mounted at the top thereof to the roof member and normally depending therefrom along the body line of the motor vehicle outwardly of the hub line, a longitudinally hinged bed assembly pivotally mounted on said side panel inwardly of the body line, means for interconnecting said bed assembly with said cab section for laterally extending said bed assembly on extension of said roof member; and a trunk section rearwardly of said van section.

A motor vehicle constructed in accordance with the preferred embodiment of the present invention has enhanced utility. Thus, it is suitable for normal use as a station wagon type vehicle through the provision of ample space for a second seat and for storage space rearwardly of the second seat. On removal of the second seat and selective extension of the roof section, the van portion assumes a configuration suitable for trucking service for the transportation of bulky objects. On full extension of the roof section, lateral expansion of the side sections and rearrangement of the second seat, in a manner to be described, the van portion assumes a configuration suitable for use as an overnight camping facility through the provision of a housing compartment having adequate head space, adequate aisle space, adequate sleeping space for four individuals, and adequate service space for washing, cooking, etc.

The invention will be further described with respect to the accompanying drawings wherein:

FIG. 5 is a perspective view of the motor vehicle of FIG. 1 with the van section fully expanded;

FIG. 6 is a fragmentary schematic perspective rear view of the motor vehicle of FIG. 1 showing the interrelationship of the back panel of the van section of the trunk section.

Figure 1:
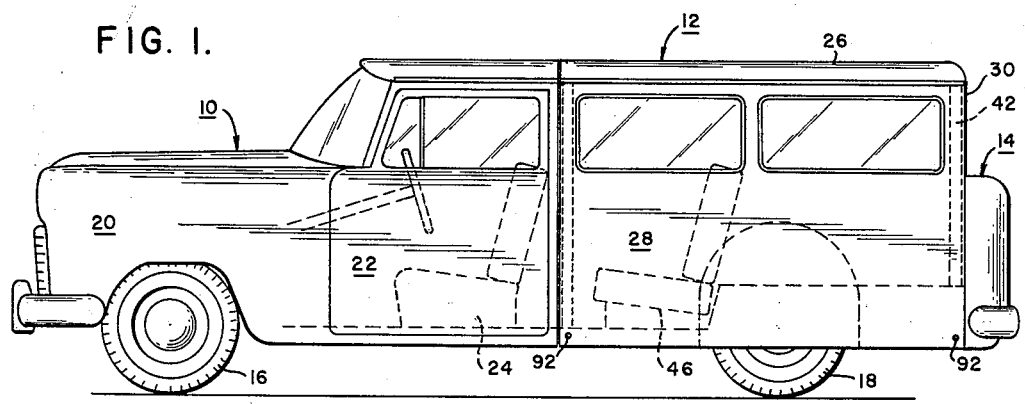
FIG. 1 is a side elevational view of a motor vehicle constructed in accordance with a preferred embodiment of the present invention with the van section retracted for passenger service.

Turning now to FIG. 1, there is shown a multi-functional motor vehicle comprising a forward cab section 10 of any desired conventional construction, a van section 12, and a trunk section 14 mounted on the conventional frame (not shown) of a motor vehicle; the frame, in turn, being supported by a pair of front wheels 16—16 and a pair of rear wheels 18—18. The forward cab section 10 is conventional, comprising a motor compartment 20, side doors 22, and a front seat 24 which is preferably constructed in the normal manner for pivotal movement of the backrests in order to provide an entry-way into the interior of the van section 12.

The van section 12 is covered with a roof section 26 mounted on the frame for vertical extensible movement in a manner to be described. Each of a pair of side panels 28 is pivotally mounted on the roof member 26 and normally depends from the roof member 26 along the body line of the vehicle and outwardly of the lateral hub line so as to cover the rear wheels 18—18. A windowed back panel 30 is also pivotally mounted on the roof member 26 and normally depends therefrom forwardly of the truck section 14, as shown more clearly, for example, in FIG. 6.

As shown in FIG. 1, the back panel 30 is normally dependent from the roof member 26 forwardly of the trunk section 14 in order to close in the rear of the van section 12. Suitable means (not shown) are provided such as interior side panels extending downwardly from the floor to enclose the rear wheel housings and upwardly and outwardly to join the windowed side panels 28 adjacent and below the window line to finish off the interior of the van section 12.

Figure 2:
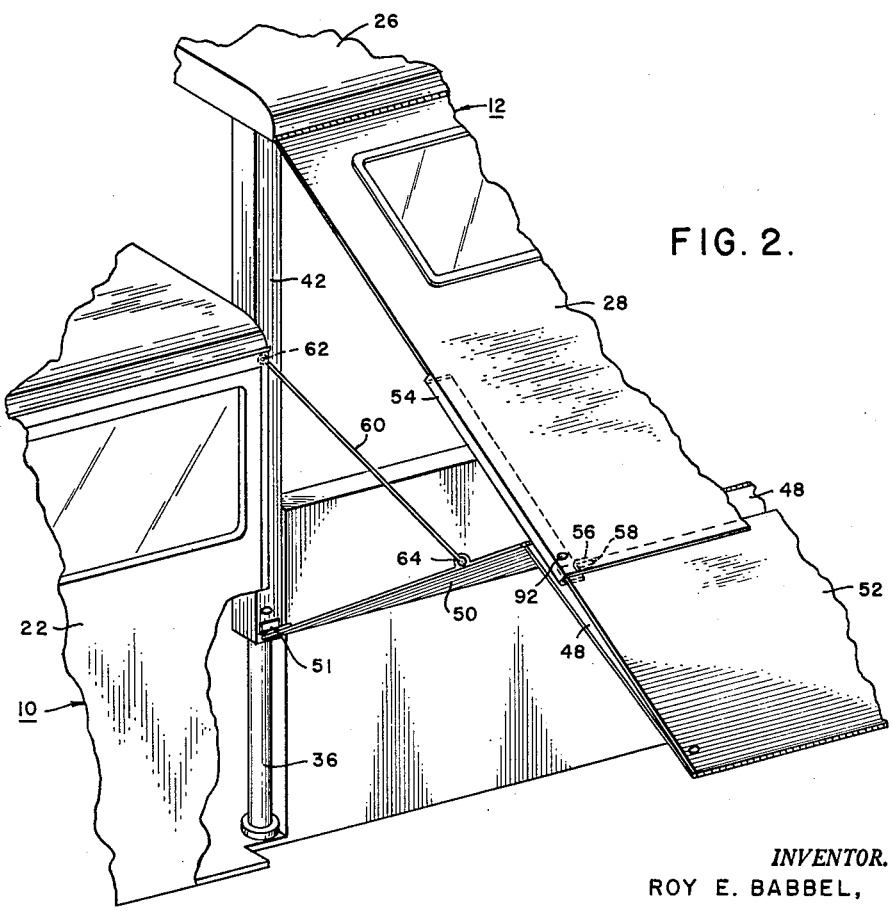
FIG. 2 is a fragmentary schematic perspective view of the motor vehicle of FIG. 1 with the van section partially expanded.
Figure 4:
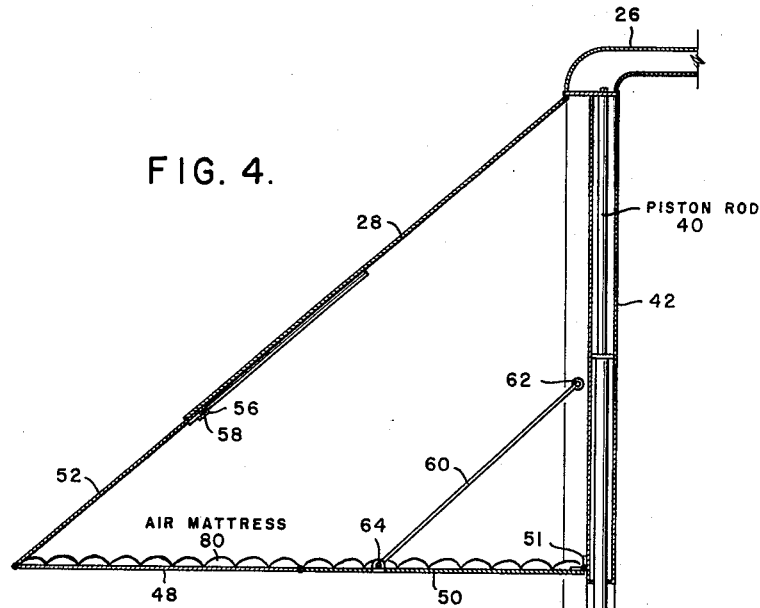
FIGS. 3 and 4 are fragmentary cross-sectional views of the embodiment shown in FIG. 1.
Figure 3:
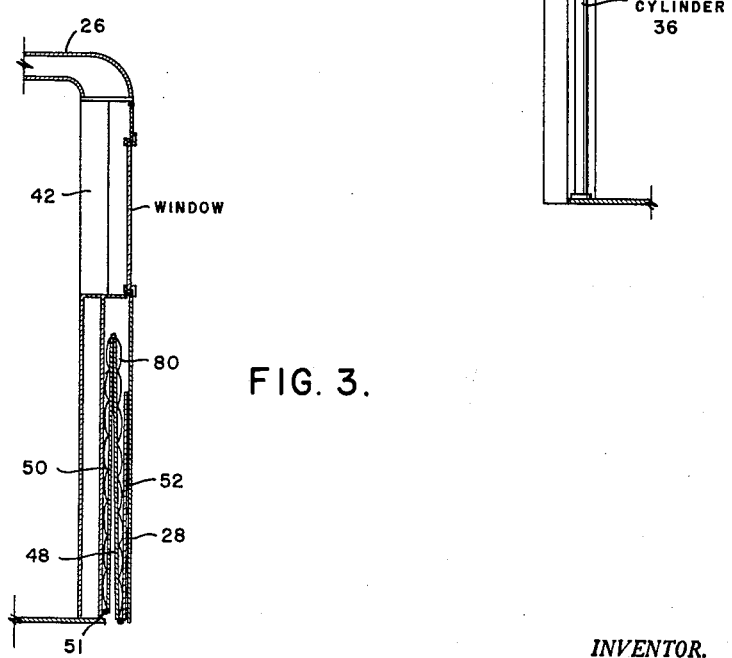

A preferred means for supporting the roof section 26 for vertical extensible movement is shown schematically in FIGS. 2–4. Four corner post sections, each of like construction, is mounted on the vehicle frame (not shown), each comprising a cylinder 36 fixed to the frame at the bottom, a piston (not shown) in the cylinder, a piston rod 40 slidably mounted in the cylinder 36, and an open-bottomed cover member 42 covering the cylinder 36 and fixed to the piston rod 40 for movement therewith. The roof section 26 is fixed at each corner thereof to the corresponding cover member 42. Suitable means, such as a hydraulic system (not shown) is provided for simultaneously moving each of the pistons and associated piston rods 40 upwardly in the corresponding cylinder 36 when it is desired to raise or lower the roof 26.

It will be understood that the hydraulic cylinders 36 constitute a preferred means for extending the roof section 26 but that any other suitable power system may be provided, such as an electric motor-powered screw-type jack assembly, a manually or motor-powered winch assembly, etc. The power source for raising the roof section 26 is preferably a power source normally carried by the motor vehicle, such as the braking hydraulic system, the motor, etc. However, a separate power system may be provided, if desired.

When the van section 12 is to be used for passenger service, the piston rods 40 will be retracted and the van section 12 will have the configuration shown in FIG. 1. A rear seat 46 is provided, which is preferably a two-section seat constructed in a manner to be described.

Figure 7:
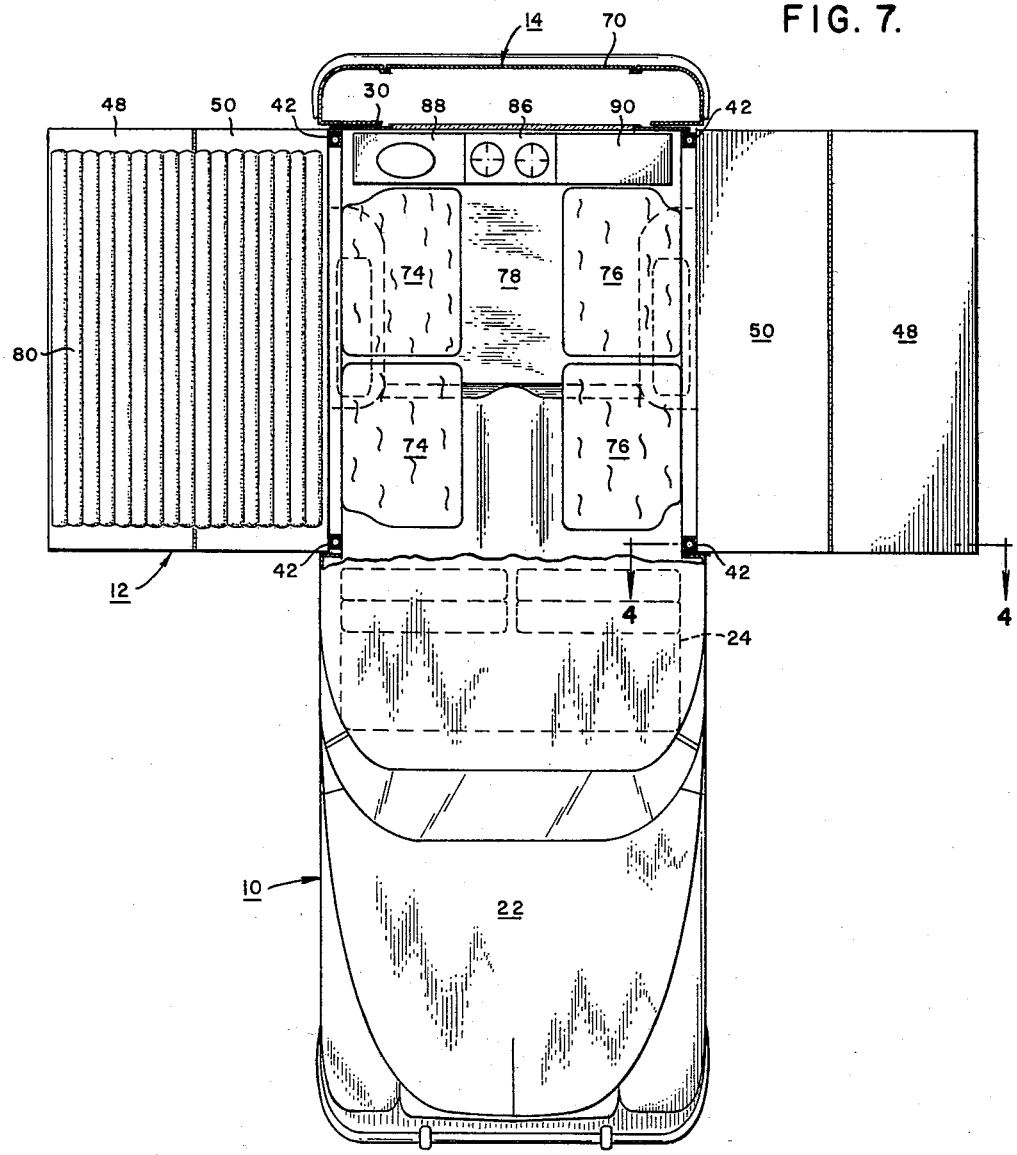
FIG. 7 is a top plan view of the motor vehicle of FIG. 1 with parts broken away showing an arrangement of the interior of the van section on complete expansion thereof for housing service.

The rear seat 46 is preferably constructed in two portions and is preferably releasably mounted so that the two seat cushion portions 74 may be dismounted from their normal position and laterally aligned on one side of the van section 12 and so that the two back portions 76 may be similarly dismounted from their normal position and laterally aligned on the other side of the van section 12 whereby each portion acts as a head rest and whereby an aisleway 78 is provided (see FIG. 7 for this arrangement).

A bed assembly is provided on each side of the motor vehicle which is adapted to nest inside the corresponding side panel 28 below the window line when the van section 12 is retracted for passenger service. With reference to FIGS. 2 and 4, each bed assembly comprises a longitudinally hinged bed member comprising an outer bed plate 48 and an inner bed plate 50. As shown more clearly in FIG. 2, inner plate 50 is pivotally mounted at each trailing corner edge to the lower portion of the corresponding cover member 42 by any suitable means, such as a hinge 51. The outer plate 48 is pivotally mounted at each trailing edge thereof to an extension plate 52 which is slidably mounted on the corresponding side panel 28 in any desired manner. For example, the side panel 28 may be provided at each lower side edge thereof with an underturned side extension defining a guide 54 within which the extension plate 52 is slidably mounted. Appropriate latch means such as hooks 56—58 may be provided for holding the extension plate 52 when it is in a fully extended position.

In accordance with the present invention, means are provided on each side of the motor vehicle for laterally, outwardly extending the inner and outer plates 50 and 48 of the bed plate, the extension plate 52 and the side plate 28 on vertical extension of the roof member 26. For example, an extension rod 60 is releasably mounted at one end 62 thereof on the cab section 10 and, at the other (bed plate) end 64 thereof, is releasably mounted on the inner plate member 50, as shown in FIG. 2.

When the roof section 26 is in a fully retracted position, the parts will have the configuration shown in FIG. 3. When hydraulic pressure is admitted to the bottom of the cylinder 36, the piston and associated piston rod 40 at each corner of the van section 12 will be raised, thus vertically extending the roof section 26. At the same time, each extension rod 60 will pivot about the end 62 thereof on the cab section 10 forcing the inner plate outwardly as the lower edge thereof is elevated by the cover member 42. Lateral movement of the inner plate 50 will cause corresponding lateral movement of the outer plate 48 and this motion, in turn, will be transmitted to extension plate 52 and the side panel 28, as is shown more clearly in FIG. 2.

When the roof member 26 is fully extended, as shown in FIG. 4, the inner and outer plates 50 and 48 will be in a horizontal position at about the normal bottom window line of the motor vehicle. Each side panel 28 and extension plate 52 will be at an angle and locked in place by mating hooks 56 and 58. As a consequence, housing space is provided in the interior of the van section 12.

The front and rear end of the van section 12 are partially open to the elements when the van section 12 is extended in the described manner. Accordingly, as shown in FIG. 5, van end closing means are preferably provided, such as triangular front side closure plates 66—66 and rectangular central closure plate 68 for the front end of the van section; such closure plates being formed from any suitable material such as canvass, screen, sheet metal, etc. and being secured in place with any suitable fastening means such as snaps, cleats, screws, etc. (not shown).

As will be hereinafter described in greater detail with reference to FIG. 6, the rear end of the van section 12 will remain closed by back panel 30 even when the van section 12 is in the expanded condition of FIG. 5. Therefore, complete closure of the rear of the van section 12 may be achieved through the provision of triangular rear side closure plates (not shown) constructed and arranged as shown in FIG. 5 with respect to the triangular front side closure plates 66—66.

Turning now to FIG. 6, there is shown a preferred construction for the trunk section 14. As shown, a trunk lid 70 is hinged at the bottom thereof to the body of the trunk section 14 in order to provide access to storage space in the trunk 14. When the trunk lid 70 is opened, and roof section 26 extended as shown, the back panel 30 may be pivoted outwardly and upwardly and secured in an open position by any suitable means, such as a latch 72; whereby free access is provided to the interior of the van section 12 through the trunk section 14. Moreover, since the back panel 30 may be opened or closed independently of the side panels 28—28, the back panel 30 and trunk lid 70 may be maintained in a closed position when the side panels 28 are opened in order to partially close the rear of the van section 12, as described above in connection with FIG. 5.

The interior of the van section 12, on expansion of the same, is shown more clearly in FIG. 7. In this showing, the rear seat 46 has been dismounted from its normal position and rearranged so that the two cushion portions 74—74 thereof are laterally aligned on one side of the vehicle and so that the two back portions 76—76 thereof are laterally aligned on the other side of the vehicle so as to provide an aisle 78. An air mattress 80 may be provided for each of the bed plates 48—50 whereby bed space for two persons is provided on each side of the vehicle. As a consequence, ample sleeping space for four individuals is provided. Each air mattress 80 may be mounted on the corresponding bed plates 48 and 50 as a permanent part of the vehicle, as shown in FIGS. 3 and 4.

It is to be observed that the air mattress 80 may be inflated in any desired manner (e.g., through the provision of a hose, not shown, connectable with the compression or exhaust side of the engine for the motor vehicle. Further, it will be noted that the arrangement of parts is such that each air mattress 80, when inflated will be level and aligned with the laterally spaced seat cushion portions 74 and back portions 76 of the rear seat in order to provide a foot and body rest for the bed sections that are thus provided.

In accordance with this embodiment, demountable service facilities are provided in the rear of the van section 12. The service facilities may comprise, for example, cooking means 86, washing means 88, and storage means 90, all of which are accessible from the interior of the van section 12 when the service facilities 82 are mounted, as shown. As another example, the trunk lid 70 may be opened and the service facilities 82 placed thereon to provide still further space in the interior of the van section 12 and to permit ready access to the service facilities 82 from the outside of the motor vehicle.

Turning back to FIG. 6, it will be seen that the extension rods 60 may be demounted, followed by extension of the roof member 26 in the described manner. When this is done, the van section 12 will assume the configuration shown in FIG. 6 since the side panels 28—28 will not be laterally extended on extension of the roof member 26. Next, the open space at the front of the van section 12 and above the cab section 10 may be closed by the central closure plate 68, as described above with respect to FIG. 5. The trunk lid 70 and back panel 30 may be extended to open the rear of the van section 12 and the rear seat 46 may be dismounted and removed. As a consequence, the van section 12 is converted to a configuration suitable for trucking service for the transportation of bulky objects.

It will be understood that ancillary features may be provided, as desired, in order to improve the rigidity or utility of the van section 12, as described. For example, a latch pin 92 may be inserted in corresponding holes adjacent each trailing corner of a side panel 28, extension plate 52, outer bed plate 50, and inner bed plate 48 and secured (e.g., threaded) to the corresponding cover member 42.

*Operation*

When the motor vehicle of the present invention is to be used for passenger service, the parts will be fully retracted and the van section 12 will have the configuration shown in FIG. 1, with the rear seat 46 mounted in the normal position, as shown. With this arrangement, occupants can enter the van section 12 through the side door 22 in the cab section 10 by depressing the back rest of the front seat 24 in the normal manner. In like fashion, access may be had to the trunk section 14 for the storage of small objects by opening the trunk lid 70.

When the motor vehicle is to be used for transporting large bulky objects, the extension rods 60 are dismounted and the pistons in each of the cylinders 36 is simultaneously actuated (e.g., by admitting fluid pressure simultaneously at the bottoms of all four of the cylinders 36) in order to raise the piston rods 40 and, hence, vertically extend the roof member 26. With the roof member extended, each of the side panels 28 may be secured against movement by means of latch pins 92. The central closure plate 68 is installed as shown in FIG. 5 and the trunk lid 62 and back panel 30 are opened, as shown in FIG. 6. The rear seat 46 may then be demounted and removed through the rear of the van section 12 and trunk 14, if desired. Thereafter, large bulky objects may be loaded in the van section 12 and the back panel 30 and trunk lid 70 may be closed. The objects may then be trucked to a desired location and removed through the rear of the motor vehicle.

When the van section 12 is to be used for housing service, the extension rods 60 are again mounted on the motor vehicle and the latch pins 92 are removed. As a consequence, extension of the roof member 26 will cause each of the extension rods 60 to fulcrum about the fixed end whereby the plate 50 will be pivoted outwardly about the hinges 51. As a consequence, the members 50, 48 and 28 will be pivoted outwardly as they are raised upwardly by the roof member 26, as shown in FIGS. 2-4. As a consequence, the van section 12 will assume the configuration shown in FIG. 5.

When the van section 12 is to be reconverted for passenger use, each air mattress 80 is deflated, the rear seat 46 is rearranged for seating service, the closure plates 66 and 68 are dismounted and hydraulic pressure is released, to thereby retract the piston rods 40 and associated cover members 46 whereby the roof section 26 will be lowered and whereby the extension rods 60 will cause the inner bed plates 50 to pivot upwardly about the hinges 51 and the outer bed plates 48 to pivot upwardly about their hinge connections with the extension plates 52. As a consequence, the extension plates 52 will slide upwardly along guides 54 and the side panels 28 will pivot downwardly from their hinged connections with the roof section 28 until the parts are in the configuration shown in FIG. 3.

It will be apparent to those skilled in the art that the present invention is susceptible to other uses and modifications and that the present embodiment has been shown for purposes of illustration only.

Having thus described my invention, what is claimed is:

1. In a wheeled motor vehicle having a frame supported on wheels and a cab portion supported on said frame, the improvement which comprises a van portion abutting said cab section comprising: vertically extendable corner post members mounted on said frame, a roof section mounted on said corner posts; a pair of side sections pivotally depended from said roof section on opposite sides thereof outwardly of the hub line of said vehicle, an extension plate extensibly mounted on each of said side sections on the inner side thereof, a pair of hinged normally closed bed sections, each having the outer bed plate thereof pivotally mounted on a corresponding extension plate on the inner side thereof and the inner bed plate thereof pivotally mounted on said corner posts and means mountable on said cab section and connectable with said inner bed plates for opening said hinged bed sections and extending said extension plates on vertical extension of said corner post members.

2. In a wheeled motor vehicle having a frame supported on wheels and a cab portion supported on said frame, the improvement which comprises a van portion abutting said cab section comprising: vertically extendable corner post members mounted on said frame, a roof section mounted on said corner posts, a pair of side sections pivotally depended from said roof section on opposite sides thereof outwardly of the hub line of said vehicle, an extension plate extensibly mounted on each of said side sections on the inner side thereof, a pair of hinged normally closed bed sections, each having the outer bed plate thereof pivotally mounted on a corresponding extension plate on the inner side thereof and the inner bed plate thereof pivotally mounted on said corner posts, means mountable on said cab section and connectable with said inner bed plates for opening said hinged bed sections and extending said extension plates on vertical extension of said corner post members, a windowed rear panel pivotally depending from said roof section at the rear thereof, a trunk section mounted on said frame rearwardly of said windowed rear panel, an inflatable mattress mounted on each of said hinged bed sections and means for normally securing said depending side sections at the lower corners thereof to said corner post members.

3. In a wheeled motor vehicle having a frame supported on wheels and a cab portion supported on said frame, the improvement which comprises a van portion abutting said cab section comprising a legged roof section vertically extensibly mounted on said frame, a pair of side sections pivotally depended from said roof section on opposite sides thereof, an extension plate extensibly mounted on each of said side sections on the inner sides thereof, a pair of hinged normally closed bed sections, each having the outer bed plate thereof pivotally mounted on a corresponding extension plate on the inner side thereof and the inner bed plate thereof mounted on the legs of said roof section for vertical pivotal movement therewith, and means mounted on said cab section and connectable with said inner bed plates for opening said hinged bed sections and extending said extension plates on vertical extension of said legged roof member.

References Cited in the file of this patent

UNITED STATES PATENTS

| | | |
|---|---|---|
| 1,527,105 | Zagelmeyer | Feb. 17, 1925 |
| 1,826,480 | Rappich | Oct. 6, 1931 |
| 2,155,582 | Bond | Apr. 25, 1939 |
| 2,890,907 | Briskie et al. | June 16, 1959 |
| 2,984,515 | Hocks et al. | May 16, 1961 |